United States Patent
Huang (10) Patent No.: US 8,610,783 B2
(45) Date of Patent: Dec. 17, 2013

(54) IMAGE CATCHING MODULE AND PORTABLE COMPUTER HAVING THE SAME

(75) Inventor: Ting-Wei Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1241 days.

(21) Appl. No.: 11/853,823

(22) Filed: Sep. 12, 2007

(65) Prior Publication Data
US 2008/0088734 A1    Apr. 17, 2008

(30) Foreign Application Priority Data
Oct. 17, 2006   (TW) ................................ 95138194 A (51) Int. Cl.
*H04N 5/225*   (2006.01)
*H04N 9/04*   (2006.01)

(52) U.S. Cl.
USPC .................... 348/207.99; 348/207.1; 348/552

(58) Field of Classification Search
USPC .................. 348/207.99, 207.1, 552, 372–376
See application file for complete search history.

(56) References Cited

U.S. PATENT DOCUMENTS

| | | | |
|---|---|---|---|
| 7,002,616 B2 | 2/2006 | Taneya et al. | |
| 7,061,536 B2 | 6/2006 | Cha | |
| 2004/0130658 A1 | 7/2004 | Yamaguchi et al. | |
| 2006/0017832 A1 | 1/2006 | Kemppinen | |
| 2006/0044396 A1* | 3/2006 | Miyashita et al. | 348/207.99 |
| 2007/0057866 A1* | 3/2007 | Lee et al. | 345/1.1 |

FOREIGN PATENT DOCUMENTS

| | | |
|---|---|---|
| CN | 1707393 | 12/2005 |
| GB | 2398696 | 8/2004 |

* cited by examiner

*Primary Examiner* — Yogesh Aggarwal
(74) *Attorney, Agent, or Firm* — Jianq Chyun IP Office (57) ABSTRACT

A portable computer including a display module and an image capture module disposed in the display module is provided. The image capture module includes a first image capture device, a pivot mechanism, and a second image capture device. The first image capture device has a circuit board, a first image sensor disposed on the circuit board, and a first lens, wherein the first image sensor is located on the optical path behind the first lens. In addition, the pivot mechanism is disposed in the display module. The second image capture device is pivotally connected to the pivot mechanism, and the second image capture device is electrically connected to the circuit board. The second image capture device has a second lens and a second image sensor, wherein the second image sensor is located on the optical path behind the second lens.

10 Claims, 10 Drawing Sheets

IMAGE CATCHING MODULE AND PORTABLE COMPUTER HAVING THE SAME

CROSS-REFERENCE TO RELATED APPLICATION

This application claims the priority benefit of Taiwan application serial no. 95138194, filed Oct. 17, 2006. All disclosure of the Taiwan application is incorporated herein by reference.

BACKGROUND OF THE INVENTION

1. Field of the Invention

The invention relates to a portable computer and, more particularly, to a portable computer having an image capture module.

2. Description of the Related Art

With the development of science, the portable computer, such as a laptop, becomes more popular and it trends to replace the desktop computer gradually. At present, image capture modules are provided in some medium and high-level portable computer. Users can communicate with remote customers or record personal video by the image catching module.

Figure 1:
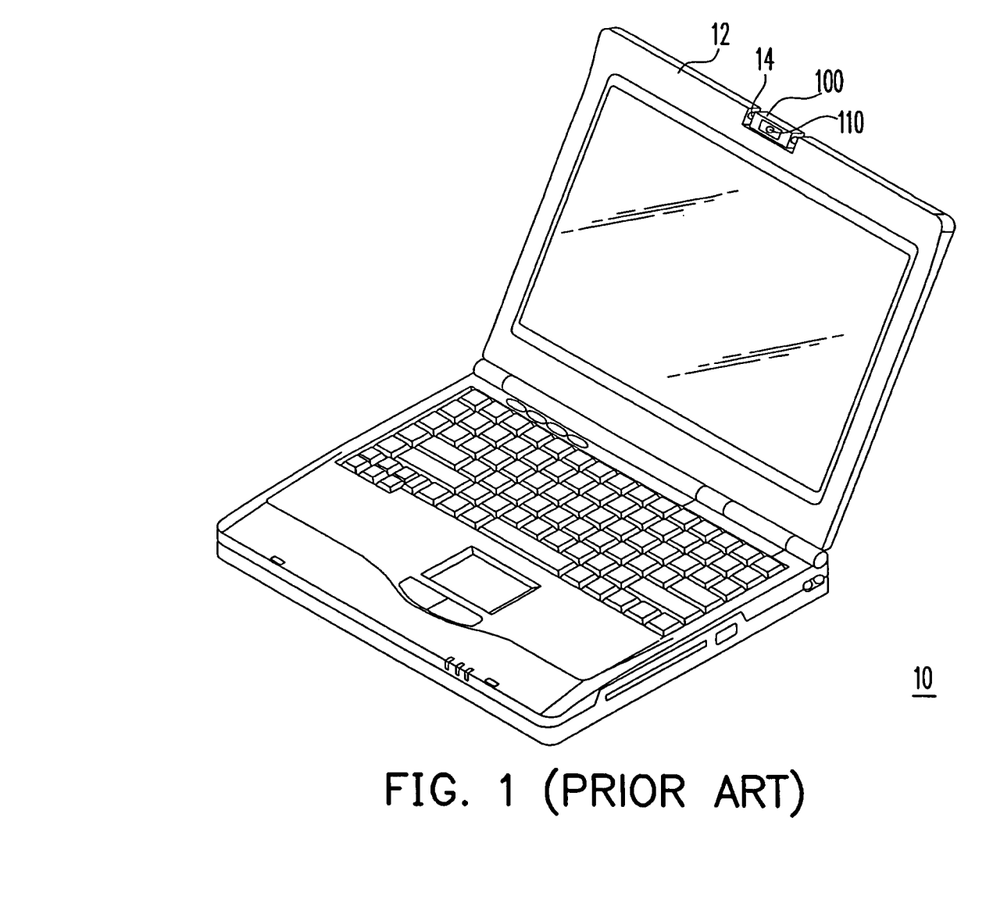
FIG. 1 is the diagram showing of a current portable computer.

FIG. 1 shows the diagram of a current portable computer. In FIG. 1, a portable computer 10 could be a laptop. An image capture module 100 is pivotally connected to a display module 12 of the portable computer 10 via a shaft 14. Users can catch the image by angling the image capture module 100.

However, due to the single lens 110 on the image capture module 100, users cannot catch images on different backgrounds by one lens 110 at the same time. For example, for distance learning, the image capture module 100 of the portable computer 10 cannot send the image of speaker and the image of audiences to a remote user at the same time. It affects the quality of the distance learning since the remote user is unable to see the interaction between the speaker and the audiences.

BRIEF DESCRIPTION OF THE INVENTION

An objective of the present invention is providing an image capture module which has two image capture devices to catch the images of different backgrounds.

Another objective of the present invention is providing a portable computer to catch the images of different backgrounds.

To achieve the above and other objectives, the invention provides an image capture module disposed on a display module of a portable computer. This image capture module includes a first image capture device, a pivot mechanism, and a second image capture device. The first image capture device has a circuit board, a first image sensor disposed on the circuit board, and a first lens, wherein the first image sensor is located on the optical path behind the first lens. In addition, the pivot mechanism is disposed in the display module. The second image capture device is pivotally connected to the pivot mechanism, and the second image capture device is electrically connected to the circuit board. The second image capture device has a second lens and a second image sensor, wherein the second image sensor is located on the optical path behind the second lens.

In one embodiment of the invention, the first lens and the second lens face to opposite directions.

In one embodiment of the invention, the pivot mechanism connects to one side of the circuit board.

In one embodiment of the invention, the image capture module further includes a Flexible Printed Circuit (FPC), and the second image capture device electrically connects to the circuit board via the FPC.

In one embodiment of the invention, the second image sensor electrically connects to the circuit board.

In one embodiment of the invention, the second image capture device further includes a base and a first shaft and a second shaft both extend from the base. The second image sensor is disposed on the base. The first shaft is pivotally connected to the pivot mechanism, and the second shaft is pivotally connected to the display module.

In one embodiment of the invention, the image capture module further includes a knob connecting to the second shaft.

In one embodiment of the invention, the pivot mechanism is a barrel.

In one embodiment of the invention, there is a recess in inner surface of the pivot mechanism, and there are some protrusions of the first shaft. When the first shaft rotating, one of the protrusions is suitable for being wedged on the recess.

In one embodiment of the invention, the several protrusions are arranged on the connection surface between the first shaft and the pivot mechanism in equidistance.

The invention also provides a portable computer which including a display module and the image capture module mentioned above, wherein the image capture module is disposed on the display module.

In one embodiment of the invention, the display module has several openings to expose the first lens and the second lens.

In one embodiment of the invention, the display module has a shaft hole, and the second shaft passes through the shaft hole.

In one embodiment of the invention, the display module has an opening to expose the knob which connects with the second shaft.

In the portable computer of the present invention, the image module has two image capture devices. The two image capture devices face to opposite direction to catch the images on different backgrounds. For example, in distance learning, one image capture device faces to speaker, and the other image device faces to the audiences, so that the remote customer is able to watch the interaction between the speaker and the audiences. In detail, the image capture module of the invention can catch the images on different backgrounds and this feature extends the application usage of the portable computer.

These and other features, aspects, and advantages of the present invention will become better understood with regard to the following description, appended claims, and accompany drawings.

DETAILED DESCRIPTION OF THE EMBODIMENTS

Figure 2A:
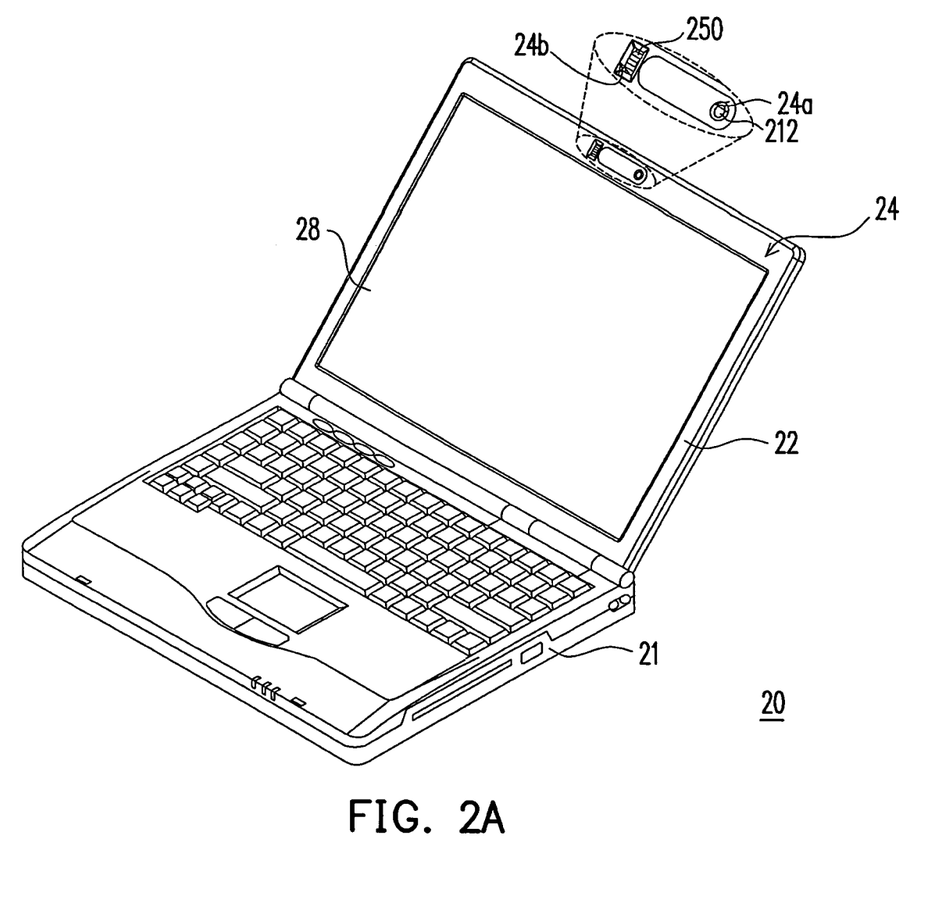
FIG. 2A is the diagram showing of the portable computer of the preferred embodiment of the invention.
Figure 2B:
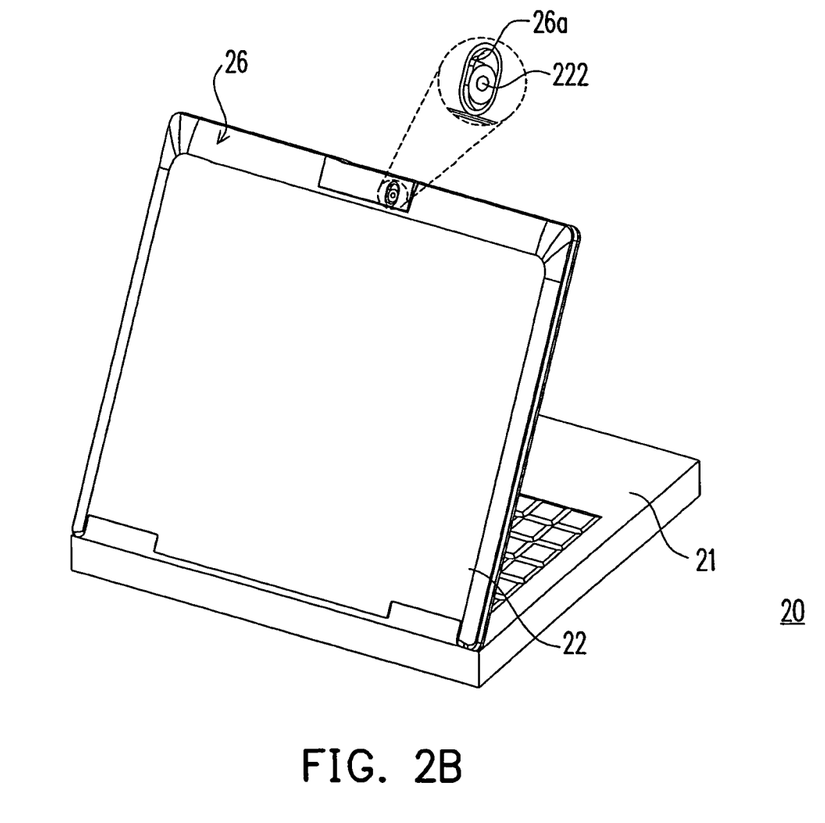
FIG. 2B is the diagram showing of the other view of the portable computer of FIG. 2A.

FIG. 2A shows the diagram of a portable computer of a preferred embodiment of the invention, and FIG. 2B shows another view of the portable computer of FIG. 2A. Referring to FIGS. 2A and 2B, the portable computer 20 of the embodiment, such as a laptop computer, includes a host 21 and a display module 22. The display module 22 includes an image capture module. In other embodiments, the portable computer 20 could be a Tablet Personal Computer, a Palmtop, or an Ultra Mobile Personal Computer (UMPC).

In the embodiment of the invention, the image capture module includes a first lens 212 and a second lens 222. The display module 22 provides several openings to expose the first lens 212 and the second lens 222 which used to catch images.

In the embodiment of the invention, the first lens 212 is embedded in an opening 24a of a first surface 24 of the display module 22. The second lens 222 is embedded on an opening 26a of a second surface 26 of the display module. The first surface 24 of the display module 22 is disposed on a surface of a display 28, and the second surface 26 of the display module 22 is opposite to the first surface 24. In another words, the first lens 212 and the second lens 222 face to the opposite directions. Users can catch images on different background through the first lens 212 and the second lens 222. For example, for distance learning, the first lens 212 faces to the speaker and the second lens 222 faces to audience. Therefore, the remote customer can see the video of the speaker and audience simultaneity, and see the interaction between the speaker and the audiences. In addition, there is an opening 24b on the first surface 24 of the display module 22. The opening 24b exposes a knob 250 of the image capture module, wherein the knob 250 is used to adjust the catching angle of the second lens 222 by rotating.

Figure 3:
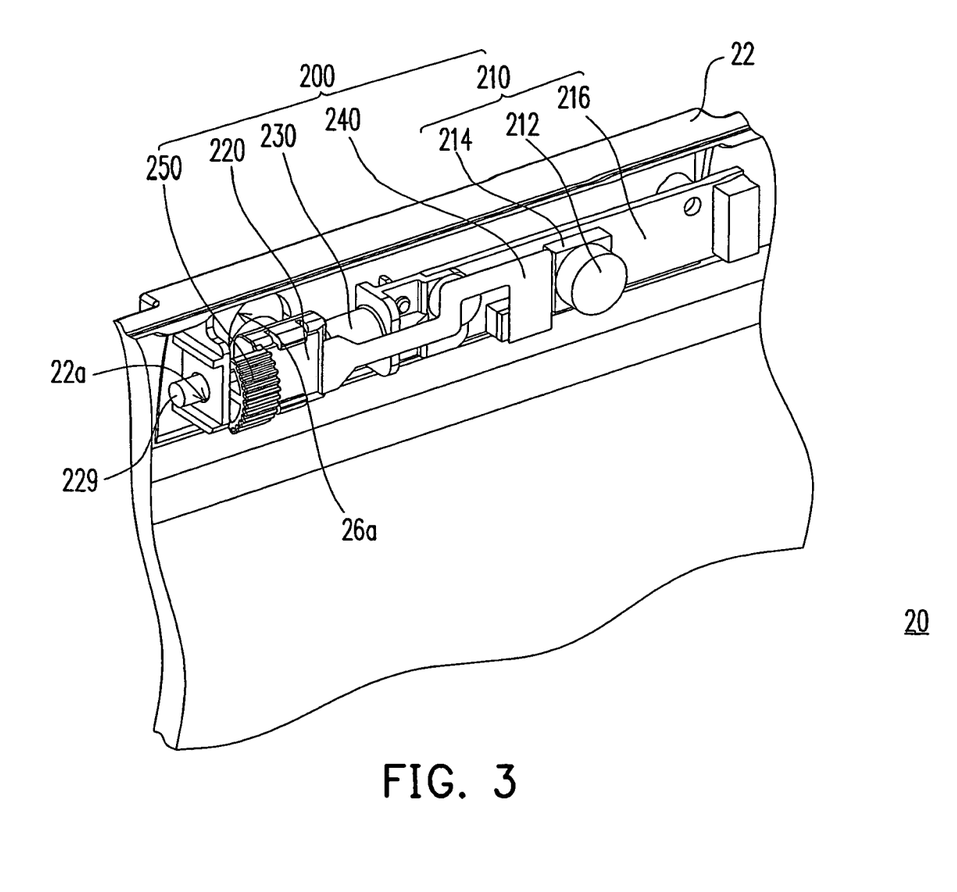
FIG. 3 is the diagram showing of the portable computer of FIG. 2 after removing part of its housing.
Figure 4A:
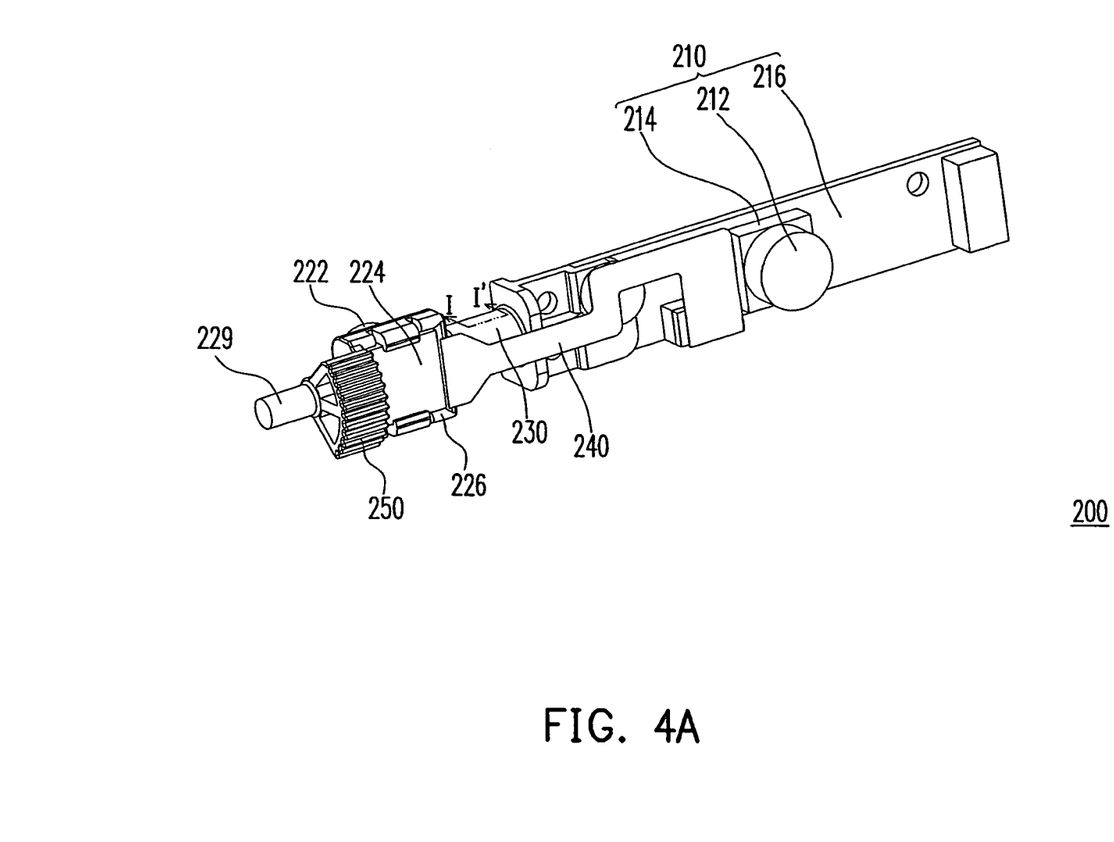
FIG. 4A is the constitution diagram showing of the image capture module of FIG. 3.
Figure 4B:
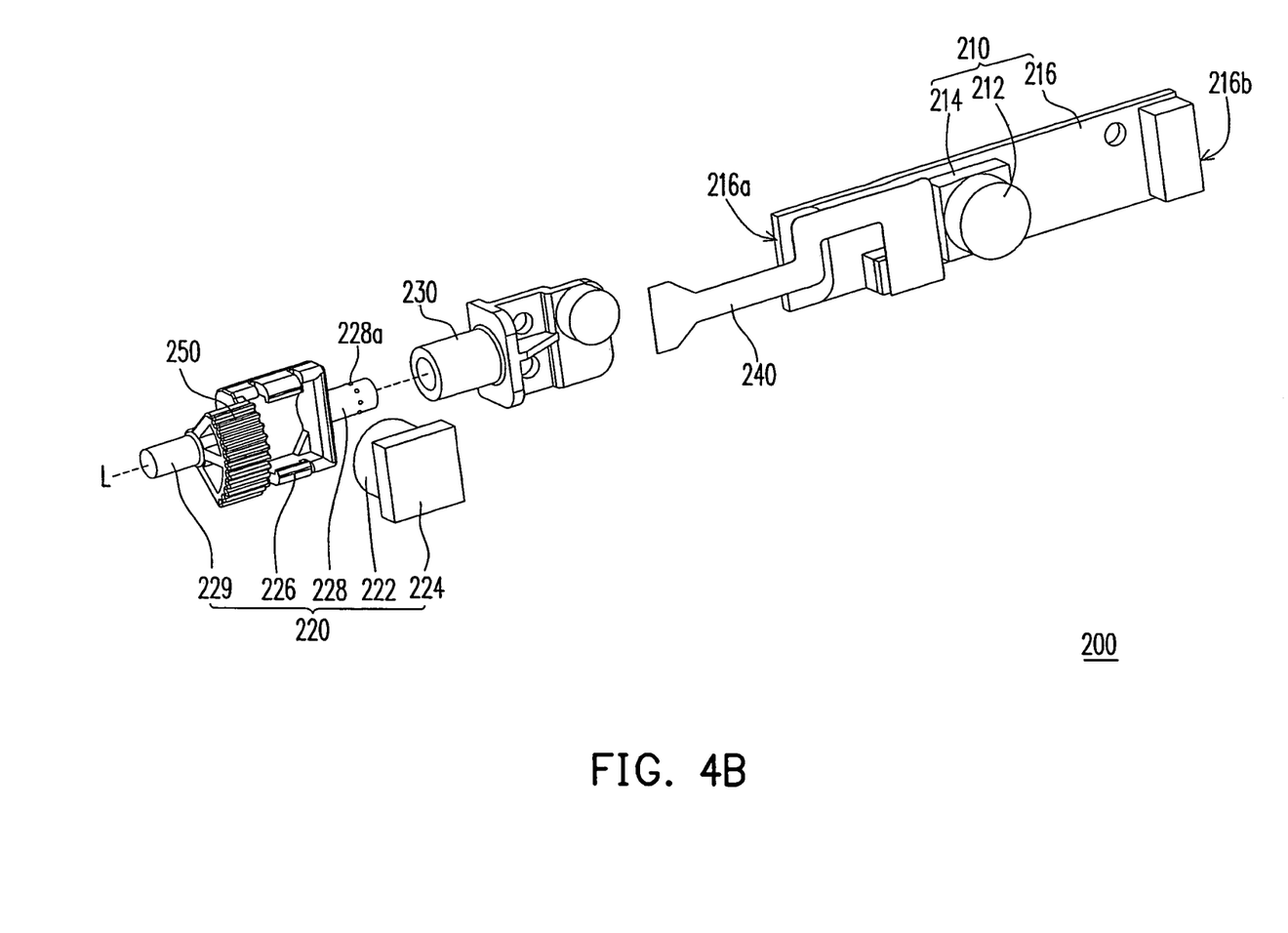
FIG. 4B is the exploded diagram showing of the image capture module of FIG. 3.

FIG. 3 shows the diagram of the portable computer of FIG. 2 after removing part of its housing. FIG. 4A shows the constitution diagram of the image capture module of FIG. 3, and FIG. 4B shows the exploded view of the image capture module of FIG. 3. Please refer to FIG. 3, FIG. 4A, and FIG. 4B, the image capture module 200 of the embodiment includes a first image capture device 210, a second image capture device 220, and a pivot mechanism 230. The first image capture device 210 has a first image sensor 214, a circuit board 216 provided with an image driver chip, and the first lens 212. In the embodiment, the circuit board 216 can be disposed on the display module 22 directly or indirectly, and the pivot mechanism 230 is disposed on the display module 22. Furthermore, a side 216a of the circuit board 216 is connected to the pivot mechanism 230 and another side 216b of the circuit board 216 is fastened on the display module 22. Therefore, the circuit board 216 can be fastened on the display module 22 by screw or other proper fixing element. The first image sensor 214 is disposed on the circuit board 216, and is located on the optical path behind the first lens 212.

The second image capture device 220 of the embodiment is pivoted along a rotation axis L at the pivot mechanism 230. In the embodiment of the invention, the second image capture device 220 includes the second lens 222, a second image sensor 224, a base 226, and a first shaft 228 and a second shaft 229 both extended from the base 226.

The second image sensor 224 is disposed on the base 226 and located on the optical path behind the second lens 222. The first shaft 228 is pivotally connected to the pivot mechanism 230 which may be a barrel. The second shaft 229 is pivotally connected to a shaft hole 22a of the display module 22 and connected to the knob 250. When user adjusting the knob 250, the second lens 222 is turned together into a proper position to catch images. The first sensor 214 and the second image sensor 224 can be Complementary Metal Oxide Semiconductors (CMOS), or Charge Coupled Devices (CCD), or any other proper optical components.

The second image capture device 220 of the embodiment can be electrically connected to the circuit board 216 by a Flexible Printed Circuit (FPC) 240 (or a bus). Therefore, the image signal from the second image capture device 220 can be sent to the circuit board 216 by the FPC 240, and the image driver chip of the circuit board 216 can send the control signal to the second image device 220 by the FPC 240 as well. The circuit board 216 can process the images catching by the first lens 212 and the second 222, and send the control signals the first lens 212 and the second lens 222.

Figure 5:
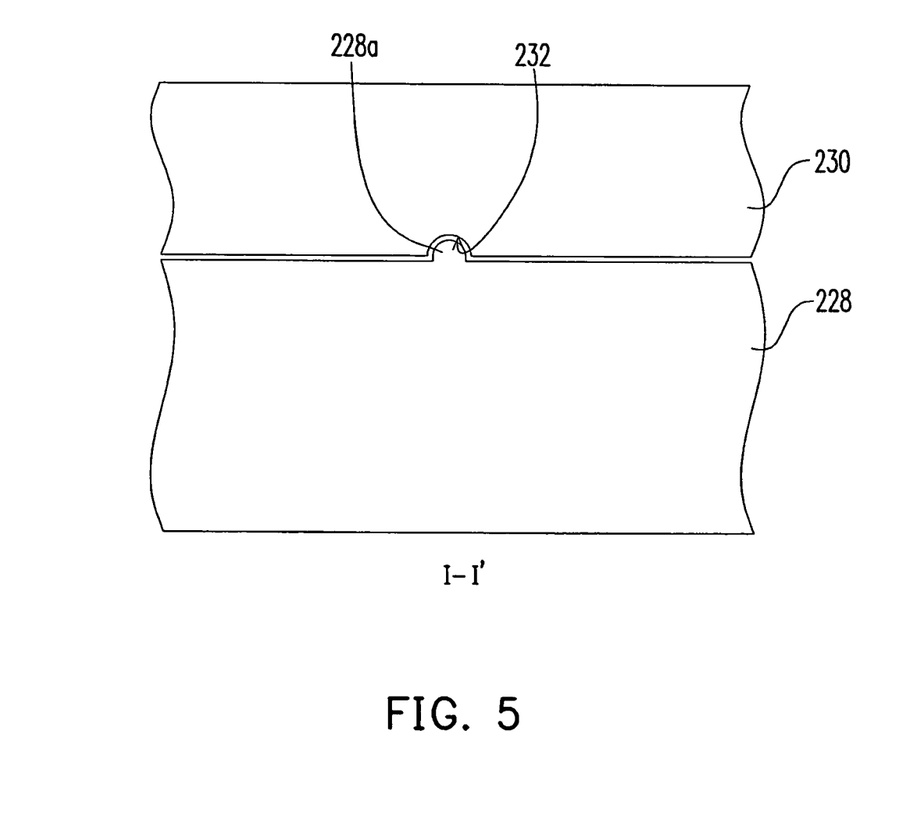
FIG. 5 is the sectional diagram showing along I-I' line of the FIG. 4A.

To adjust the angle of the second lens 222 easily, the first shaft 228 has several protrusions 228a, and a recess 232 is formed on the inner wall of the pivot mechanism 230 in the embodiment (referring to FIG. 5 which is the sectional view along I-I' line of the FIG. 4A). The several protrusions 228a are arranged on the connection surface of the first shaft 228 and the pivot mechanism 230 in equidistance, and one of the protrusions 228a is suitable for wedging in the recess 232. When users rotating the knob 250, the several protrusions 228a of the first shaft 228 can be wedged in the recess 232 in turn. Users can fix the image capture device 228 on a proper position by wedging the protrusions 228a into the recess 232, and then catch images.

Figure 6:
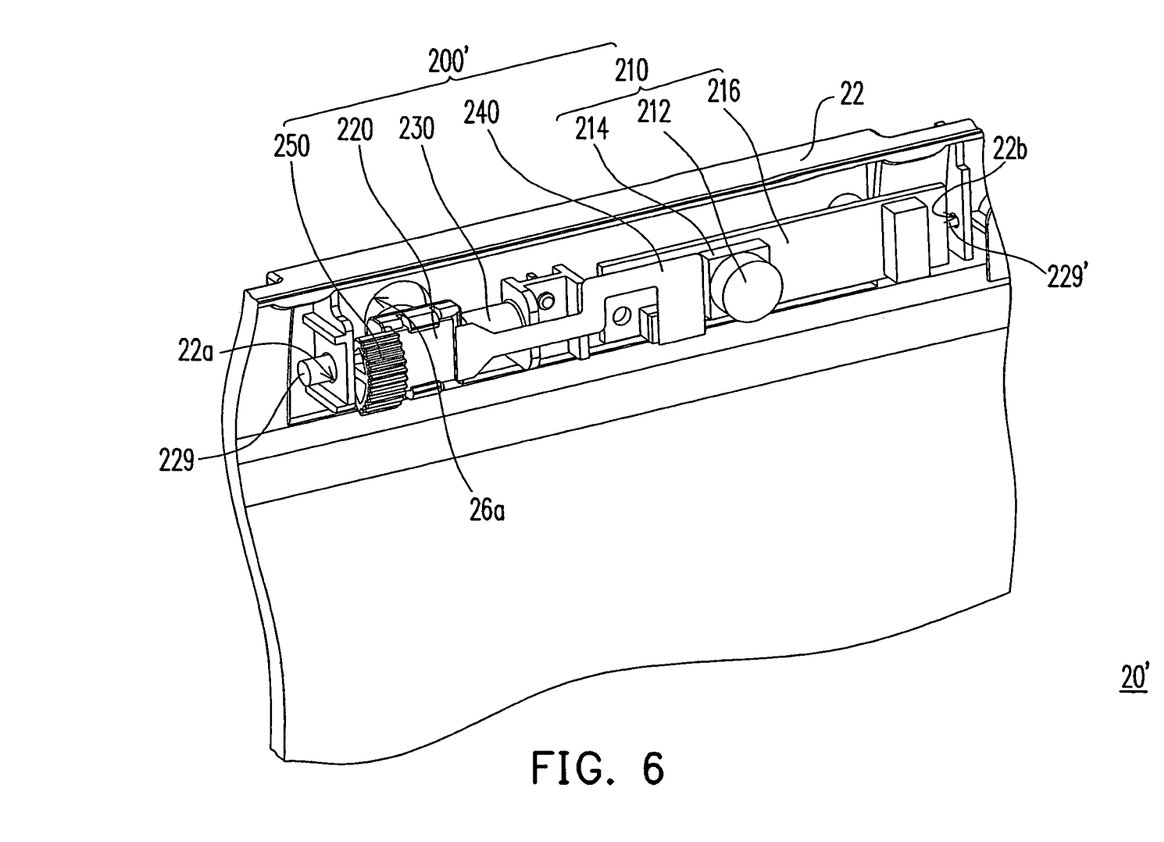
FIG. 6 is the diagram showing of the portable computer of another preferred embodiment after removing part of its housing.
Figure 7A:
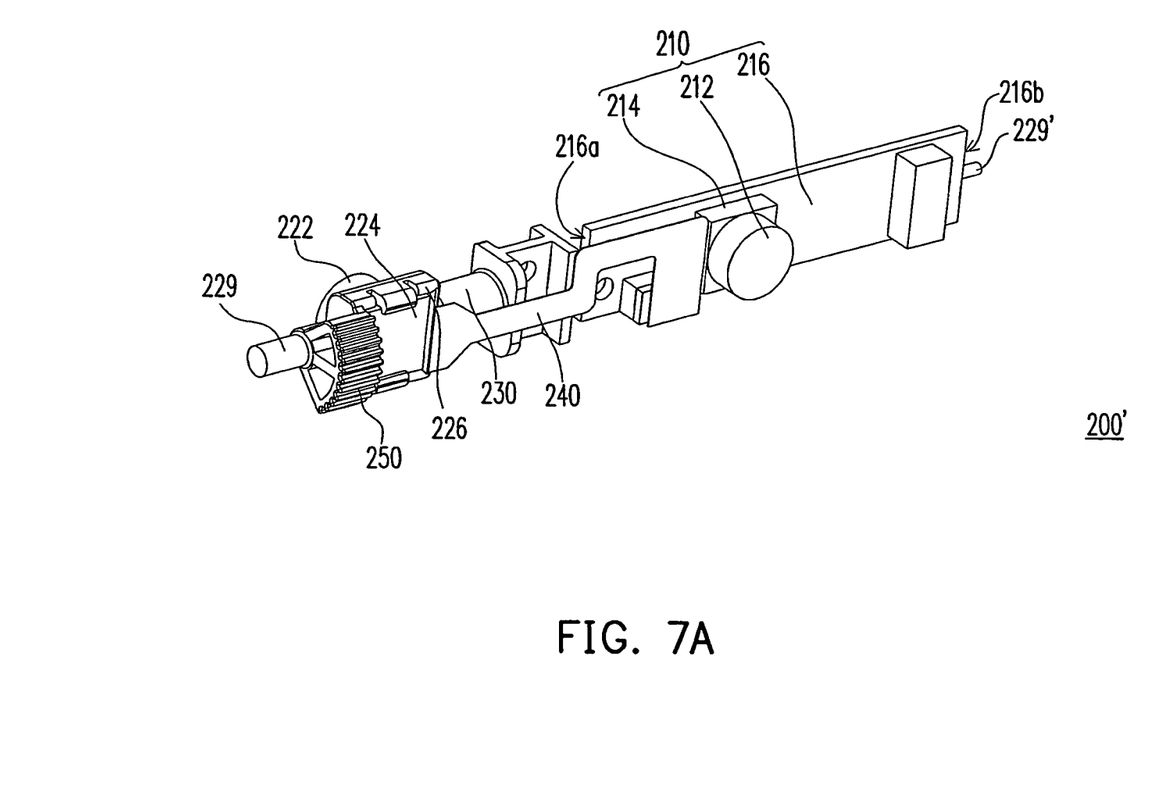
FIG. 7A is the constitution diagram showing of the image capture module of FIG. 6.
Figure 7B:
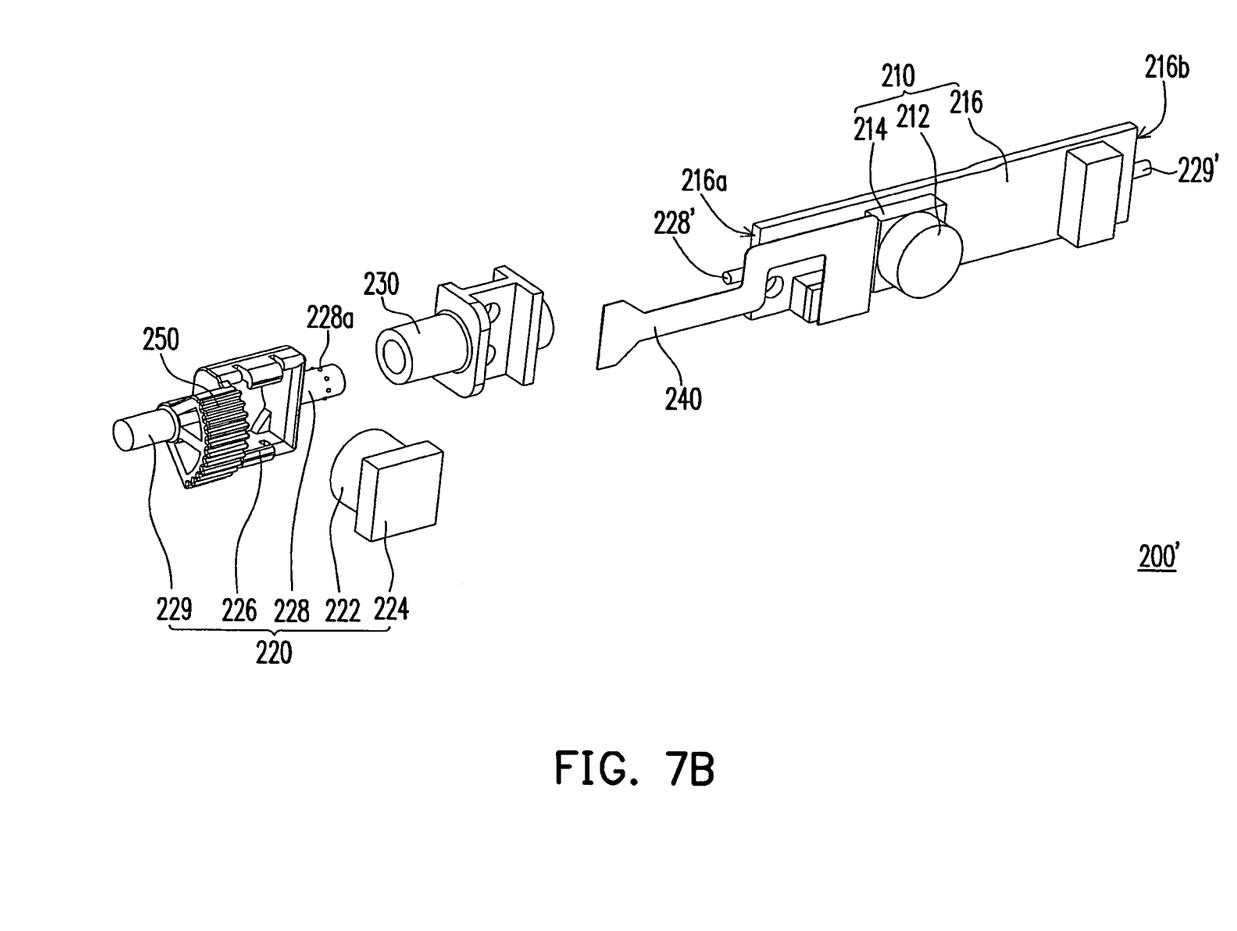
FIG. 7B is the exploded diagram showing of the image capture module of FIG. 6.

Furthermore, the image capture module 200 of the FIG. 4A is not the only embodiment of the invention. Another embodiment is described below, and the same components are denoted with the same reference numbers for easy understanding. FIG. 6 shows the diagram of another portable computer after removing part of its housing. FIG. 7A shows the constitution diagram of the image capture module of FIG. 6, and FIG. 7B shows the exploded view of the image capture module of FIG. 6. Referring to FIG. 6, FIG. 7A, and FIG. 7B, a portable computer 20' is similar to the portable computer 20 of the above embodiment. The difference is that the image capture module 200' of this embodiment further includes a third shaft 228' disposed on a side 216a of the circuit board 216 and a fourth shaft 229' disposed on another side 216b of the circuit board 216. The third shaft 228' is pivotally connected to the pivot mechanism 230. The fourth shaft 229' passes through another shaft hole 22b of the display module 22. Therefore, users can adjust the angle of the image-catching not only by rotating the second image capture device 220, but also by rotating the first image capture device 210.

Certainly, the invention not limits the method for the first image capture device 210 and the second image capture device 220 pivoted to the display module 22. Any methods to adjust the angle the first and the second image capture devices 210 and 220 to catch the images on different background of the image capture modules are within the scope of the invention.

With the growing request for lighter and thinner portable computer in the market, there is a need for the associated image capture module to become lighter and thinner. Therefore, the preferred embodiments only employ one circuit board to control the operation of the first and the second image capture devices (or process the images taken from the first and the second image capture device).

From above, in the portable computer of the preferred embodiment, the image capture module has two image capture devices which face to opposite directions. So that users may provide more image information to remote clients in interaction. For example, the image capture module of the preferred embodiment can provide the images of speaker and audiences to the remote clients in distance learning and video conferencing. In another words, the portable computer of the preferred embodiment is applied more widely.

In addition, since only one circuit board is used in the preferred embodiment to control the operation of the two image capture devices (or process the images taken from the two image capture devices), the image capture module is smaller in size to match the request of lighting the portable computer. Furthermore, the preferred embodiment also employs flexible printed circuit as the movable mechanism and to light the portable computer.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable computer, comprising:
    a display module; and
    an image capture module disposed on the display module, the image capture module comprising:
        a first image capture device having a circuit board, a first image sensor, and a first lens, wherein the first image sensor is disposed on the circuit board and located on the optical path behind the first lens;
        a pivot mechanism disposed on the display module; and
        a second image capture device pivotally connected between the pivot mechanism and the display module along a rotation axis and electrically connected to the circuit board, wherein the second image capture device includes a second lens, a second image sensor, a base, a first shaft and a second shaft, the first shaft and the second shaft extend from the base, the second image sensor is disposed on the base, and the first shaft is pivotally connected to the pivot mechanism and the second shaft is pivotally connected to the display module.

2. The portable computer according to claim 1, wherein the display module has several openings for exposing the first lens and the second lens.

3. The portable computer according to claim 1, wherein the image capture module further includes a flexible printed circuit for connecting the second image capture device to the circuit board.

4. The portable computer according to claim 1, wherein the image capture module further includes a knob connecting to the second shaft.

5. The portable computer according to claim 1, wherein the pivot mechanism is a barrel.

6. The portable computer according to claim 5, wherein the pivot mechanism has a recess in the inner wall and the first shaft has several protrusions, and one of these protrusions is suitable to wedge on the recess when the first shaft rotates.

7. The portable computer according to the claim 6, wherein the protrusions are arranged on a connection surface between the first shaft and the pivot mechanism in equidistance.

8. An image capture module disposing on a display module of a portable computer, comprising:
    a first image capture device having a circuit board, a first image sensor, and a first lens, wherein the first image sensor is disposed on the circuit board and located on the optical path behind the first lens;
    a pivot mechanism, disposing on the display module; and
    a second image capture device pivotally connected between the pivot mechanism and the display module along a rotation axis and electrically connected to the circuit board, wherein the second image capture device includes a second lens, a second image sensor, a base, a first shaft and a second shaft, the first shaft and the second shaft extend from the base, the second image sensor is disposed on the base, and the first shaft is pivotally connected to the pivot mechanism and the second shaft is pivotally connected to the display module.

9. The image capture module according to claim 8, further comprising a flexible printed circuit for connecting the second image capture device to the circuit board.

10. The image capture module according to claim 8, further comprising a knob connecting to the second shaft.

* * * * *